United States Patent
Ryberg et al.

(10) Patent No.: US 8,167,775 B2
(45) Date of Patent: May 1, 2012

(54) METHOD FOR CLUTCH PROTECTION

(75) Inventors: Henrik Ryberg, Göteborg (SE); Erik Lauri, Mölndal (SE); Svante Karlsson, Västra Frölunda (SE); Lars Karlsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 440 days.

(21) Appl. No.: 12/441,387

(22) PCT Filed: Sep. 13, 2007

(86) PCT No.: PCT/SE2007/000803
§ 371 (c)(1),
(2), (4) Date: Nov. 15, 2009

(87) PCT Pub. No.: WO2008/036014
PCT Pub. Date: Mar. 27, 2008

(65) Prior Publication Data
US 2010/0075804 A1 Mar. 25, 2010

Related U.S. Application Data

(60) Provisional application No. 60/826,041, filed on Sep. 18, 2006.

(51) Int. Cl.
*B60W 10/02* (2006.01)
(52) U.S. Cl. .......................... 477/176; 340/453
(58) Field of Classification Search .................. 477/176, 477/177, 906; 701/67
See application file for complete search history.

(56) References Cited

U.S. PATENT DOCUMENTS

| | | | | |
|---|---|---|---|---|
| 4,425,992 A * | 1/1984 | Makita | ........................ | 192/82 T |
| 4,499,450 A * | 2/1985 | Makita | ........................ | 340/453 |
| 4,651,142 A * | 3/1987 | Klatt | ............................ | 340/453 |
| 4,722,426 A * | 2/1988 | Bellanger | ..................... | 477/175 |
| 5,190,130 A * | 3/1993 | Thomas et al. | ............... | 477/176 |
| 5,902,211 A * | 5/1999 | Jones et al. | .................... | 477/125 |
| 5,982,280 A * | 11/1999 | Fahrbach et al. | ............. | 340/453 |
| 6,152,275 A * | 11/2000 | Fischer et al. | ............... | 192/82 T |
| 6,482,123 B2 | 11/2002 | Steeby | | |
| 6,812,828 B2 * | 11/2004 | Jung | ......................... | 340/425.5 |
| 6,943,676 B2 * | 9/2005 | Mack | ............................ | 340/453 |
| 7,603,220 B2 * | 10/2009 | Jaeggle et al. | .................. | 701/69 |
| 2002/0045516 A1 | 4/2002 | Nakashima | | |
| 2006/0160659 A1 | 7/2006 | Jlang et al. | | |

FOREIGN PATENT DOCUMENTS

DE 102005033077 A1 3/2006
EP 1291220 A1 3/2003

OTHER PUBLICATIONS

International Search Report for corresponding International Application PCT/SE2007/000803.
Supp. Euroean Search Report for corresponding application EP 07 83 5044.

* cited by examiner

*Primary Examiner* — Dirk Wright
(74) *Attorney, Agent, or Firm* — WRB-IP LLP

(57) ABSTRACT

Method for protecting a clutch of a vehicle, said vehicle being provided with an engine, drive wheels and an automated manual transmission for transmitting drive power from said engine to said drive wheels. A controller can execute the steps of: sensing a power demand from the driver which results in a clutch control where the clutch is partly engaged and clutch slip occurs, measuring travelling distance(s) of the vehicle during a predetermined first time interval, initiating a first warning measure, in order to alert the driver of excessive clutch slip, if the vehicle has traveled less than a predetermined distance during said predetermined first time interval.

15 Claims, 2 Drawing Sheets

METHOD FOR CLUTCH PROTECTION

DETAILED DESCRIPTION

The invention relates to a method for protecting a clutch, from excessive slip, said clutch being arranged in a vehicle being provided with an automated manual transmission. The vehicle comprises an engine, the clutch, a gearbox having an input shaft and being connected to drive wheels of the vehicle, and a controller controlling clutch engagement.

The present invention also relates to a computer program and computer program product both to be used with a computer for executing said method.

Automated manual transmissions, i.e. manual transmissions where clutch control and gearshift control have been taken over by an automatic controller, have gained large market shares the last decade or so. Driving a vehicle with such a transmission resembles driving a vehicle with an automatic transmission, but the design differs significantly. An automatic transmission does not include a clutch; instead, a torque converter is used to partly disconnect the engine from the gearbox, e.g. at idling conditions. Most torque converters are filled with a fluid, e.g. oil, wherein the oil level in the torque converter increases with increasing engine speed. This makes it possible to achieve a torque transmission from the engine to the gearbox that increases rapidly with increasing engine speed. During engine idling, only a small torque is transmitted from the engine to the gearbox.

Driving an automatic transmission is very simple; the only effort required from the driver is to release the brake and press the accelerator pedal.

In the same time, an automatic transmission is very robust; it is almost impossible to ruin or wear an automatic transmission by erratic driver behavior, which could be easily achieved with a manual transmission. One severe drawback with automatic transmissions is, however, that they are less efficient than manual transmissions, mainly due to torque converter slip. The torque converter of an automatic transmission is designed to slip. The engine cooling system or a separate cooler for the torque converter fluid dissipates the heat generated in the torque converter.

Clutches for manual transmissions or automated manual transmissions generally do not have cooling systems, and moreover, the clutch is subject to wear if excessive slip is present.

As mentioned earlier, automatic transmissions are not harmed by torque converter slipping; this leads to an undesired driver behavior that is common on markets where vehicles with automatic transmissions are plentiful, namely that the driver of the vehicle uses a slight pressure on the accelerator pedal to keep the vehicle from e.g. rolling backwards in uphill slopes. Another common erratic driver behavior is to allow the engine to idle with the gear shift lever placed in position "drive", keep the foot on the brake and allow the vehicle to proceed forwards by releasing brake pressure. As mentioned earlier, an automatic transmission is not damaged or worn by such behavior, but the fuel consumption of the vehicle will increase.

For manual, or automated manual, transmissions, such behavior is however very detrimental; clutch slipping will wear the clutch surfaces, and in severe cases, e.g. at a high slipping torque at a high engine speed, the clutch might overheat. For manual transmissions, the responsibility for a correct clutch maneuvering lies on the driver, but for automated manual transmission, the gearshift controller controls the clutch maneuvering. It is fairly easy to "fool" the gearshift controller of an automated manual transmission system to perform an erratic clutch engagement behavior; for example, it is possible to stand still in an upward slope by applying a light pressure to the accelerator pedal, i.e. so that the torque transferred by the clutch equals the torque required to keep the vehicle from rolling backwards. Another possible way to induce wear and heat buildup in the clutch is to "creep" with the vehicle, i.e. apply a slight pressure on the accelerator pedal, and release the pressure as the vehicle starts moving. In order to reduce clutch wear in such situations, a correct driver behavior would be to apply the brake in the uphill slope, and to move the vehicle in the forward direction in "steps", i.e. wait until the road is clear, apply a proper accelerator pedal pressure, accelerate, release the gas completely and allow the vehicle to slow down.

In order to protect the clutch from overheating, U.S. Pat. No. 6,482,123 describes a method and a system for calculating heat buildup in the clutch. The calculation of U.S. Pat. No. 6,482,123 is based on information regarding engine speed, speed of the incoming shaft of the gearbox, and engine output torque, and the result of the analysis is used for informing the clutch controller to use a more aggressive clutch engagement for reducing clutch slip, or to fully disengage the clutch for reducing clutch wear and heat build-up.

The solution according to U.S. Pat. No. 6,482,123 does however not address the problem of clutch wear at the aforementioned driving situations, i.e. maintaining a position in an uphill slope by a light accelerator pedal pressure, or creep driving, since not much heat will be generated in the clutch at such driving conditions; however, a high degree of clutch wear will result.

WO9522014 describes another energy calculation based excessive clutch slip warning arrangement. Here is mentioned that the position of the clutch actuator can be used as an input for the energy calculation. U.S. Pat. No. 6,812,828 describes an excessive clutch slip warning arrangement where a warning is initiated when the rotational speed of the gearbox is zero or almost zero and the depressing of an accelerator pedal is not zero and not more than a predetermined limit. Here is also mentioned that the warning signal can be postponed a predetermined time.

One problem with prior art is that the driver can sometimes be warned even if a just low amount of clutch slip energy has been released. Another problem is that no consideration is taken to how much the vehicle has moved during the excessive clutch slip.

The method according to the invention is a method for protecting a clutch of a vehicle from excessive clutch slip, said vehicle being provided with an engine, drive wheels and an automated manual transmission for transmitting of drive power from said engine to said drive wheels. The automated manual transmission comprises said clutch, a gearbox and a controller for controlling clutch engagement in response to sensed engine speed, input shaft speed of said gearbox and drive power demand from a vehicle driver. The present invention, according to an aspect thereof, uses the steps of:

a. sensing a power demand from the driver which results in a clutch control where the clutch is partly engaged and clutch slip occurs, b. measuring travelling distance of the vehicle during a predetermined first time interval, c. initiating a first warning measure, in order to alert the driver of excessive clutch slip, if the vehicle has traveled less than a predetermined distance during said predetermined first time interval.

One advantage is that unnecessary warnings will be decreased by a method according to the invention.

In another embodiment of the invention the method comprises also the following step: starting said first time interval with the start of the clutch slip.

In further embodiment of the invention the method comprises also the following step: starting said first time interval a predetermined short time after the start of the clutch slip.

In another embodiment of the invention step c above is modified to comprise the following steps instead:
 d. initiating a measuring of vehicle speed,
 e. initiating said first warning only if; the vehicle has traveled less than said predetermined distance during said predetermined first time interval, and said measured vehicle speed is below a predetermined vehicle speed value. This will further decrease unnecessary warnings.

In a further embodiment of the invention step c above is modified to comprise the following steps instead:
 d. initiating a measuring of vehicle speed increase,
 e. initiating said first warning only if; the vehicle has traveled less than said predetermined distance during said predetermined first time interval, and said measured vehicle speed increase is below a predetermined vehicle speed increase value. This measure will also contribute to further decrease unnecessary warnings.

In another embodiment of the invention step c above is modified to comprise the following steps:
 d. initiating a measuring of vehicle speed,
 e. initiating a measuring of vehicle speed increase,
 f. initiating said first warning only if;
 the vehicle has traveled less than said predetermined distance during said predetermined first time interval, and said measured vehicle speed is below a predetermined vehicle speed value, and said measured vehicle speed increase is below a predetermined vehicle speed increase value.

In a further developed embodiment of the invention said controller can be programmed to initiate a second warning measure, in order to further alert the driver of excessive clutch slip, when a second time interval has passed, said second time interval starting when said first time interval has ended.

In another embodiment of the invention said first time interval is 4 to 10 seconds long.

In another embodiment of the invention said second time interval is 2 to 10 seconds long.

In another embodiment of the invention the method according to the invention is only used if a gearshift lever of the vehicle is put in a position ordering a forward drive. For allowing creep drive during backwards movement, the method might not be used if the gear lever is put in the reverse position.

In one embodiment of the invention, said first warning measure comprising a lighting of a light and/or a sounding of a beeper in a driver compartment of the vehicle.

In still another, embodiment, the controller could respond to the warning signal by slowly engaging the clutch. This is probably very inconvenient to the driver, which hopefully will stop the erratic behavior.

In another embodiment of the invention, the controller could respond to the warning signal by disengaging the clutch.

BRIEF DESCRIPTION OF THE DRAWINGS

Hereinafter, the invention will be described with reference to the appended drawings, wherein.

DETAILED DESCRIPTION

Figure 1:
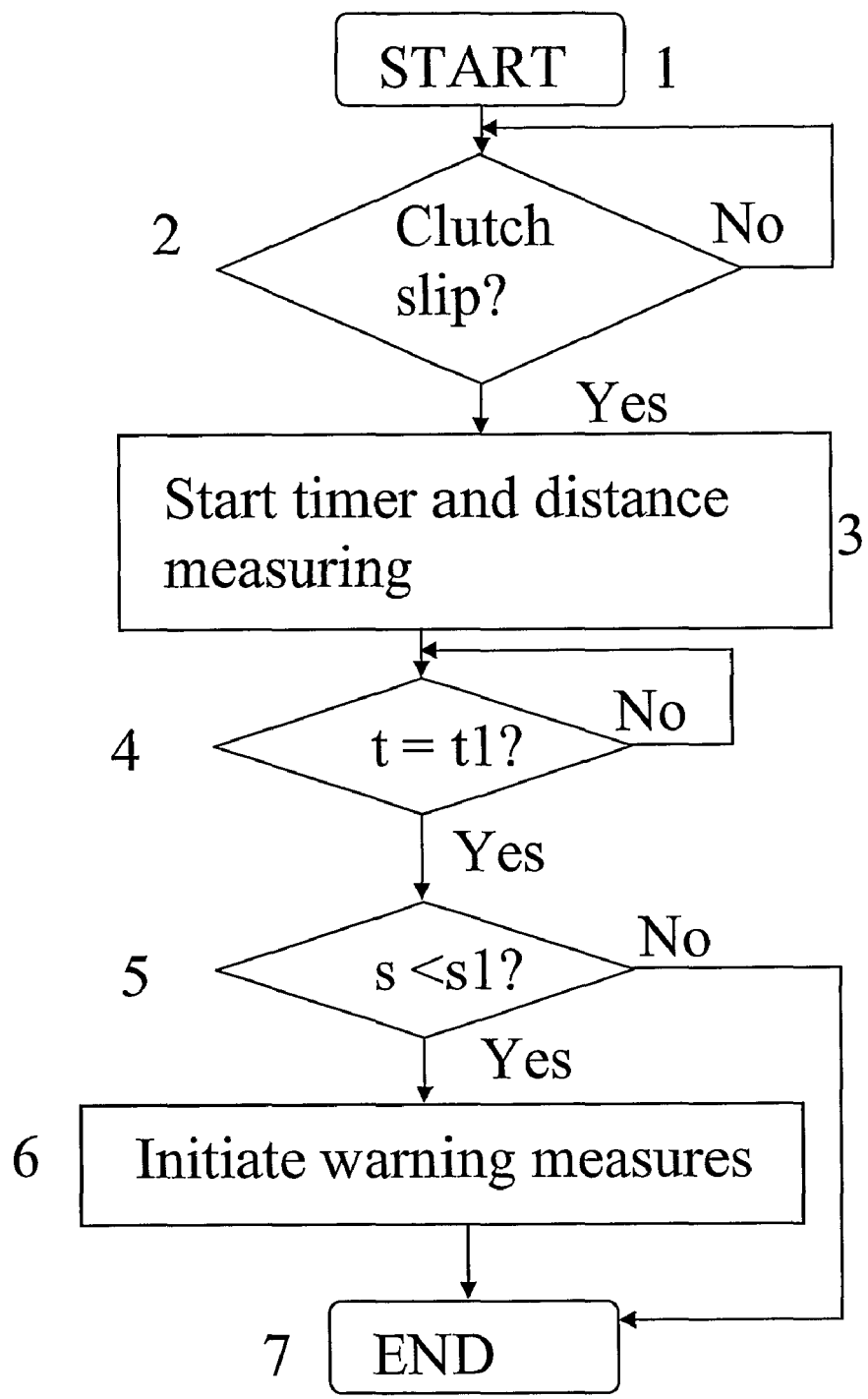
FIG. 1 is a flow scheme showing the different method steps deployed according to one embodiment of the invention and FIG. 2 shows the invention applied on a computer arrangement.

First, one common erratic driver behavior for a vehicle equipped with an automated manual transmission will be described. The most common erratic behavior, especially in geographic regions where automatic gearboxes are common, occurs when the vehicle is standing still in an upward slope. In order not to roll backwards, the driver orders a torque to be transferred from the engine (not shown), via a clutch (not shown) through the gearbox (not shown) to drive wheels of the vehicle, by applying a light pressure on the accelerator pedal of the vehicle.

In order not to roll backwards in the upward slope, the torque applied by the driver over the clutch should equal a torque transferred from the wheels, via the gearbox, to the clutch. Applying a slight accelerator pedal pressure in order to stand still in an upward slope is often referred to as "hanging" on the clutch, and it produces an excessive slip and, thus, wear in the clutch. Below, an example serving as a brief explanation of sensors and controllers governing and sensing e.g. clutch position, engine speed, accelerator pedal position and rotational speed of an incoming gearbox shaft will be given. For vehicle take-off, i.e. at a vehicle start from a standstill, the driver will apply a pressure to the accelerator pedal, which instructs the engine to increase its rotational speed. The increased engine speed is "braked" by the clutch starting to engage, hence transferring a torque to the gearbox, which torque ultimately will be transferred to the wheels; by the torque transferred to the wheels, the vehicle will take off, i.e. start from standstill. During a vehicle take-off, the clutch will "slip", since the engine speed is higher than the rotational speed of the incoming shaft. The clutch engagement will be held in a position allowing a certain amount of clutch slip until the rotational speed of the incoming gearbox shaft of the gearbox equals the engine speed. Then, the clutch will be fully engaged, allowing full engine torque being transmitted to the gearbox, and ultimately to the drive wheels. This will make the vehicle accelerate until a predetermined engine speed has been reached, after which the controller disengages the clutch, puts in a higher gear and reengages the clutch to achieve further acceleration.

For achieving a good take-off, it is of essence that the driver applies a firm pressure on the accelerator pedal, i.e. orders a rapid acceleration (in fact, most automated manual transmissions work best if the accelerator pedal is pressed down completely, hence ordering an as fast vehicle acceleration as possible). If not, the time from application of accelerator pedal pressure, i.e. slipping clutch engagement, to full clutch engagement will be long, which will lead to excessive slip and excessive wear of the clutch.

According to the invention, an erratic driver behavior regarding accelerator pedal movement, primarily "hanging" on the clutch and not applying enough accelerator pedal pressure, could be detected and prevented by applying different warnings to the driver for erratic accelerator pedal behavior.

For avoiding an erratic accelerator pedal behavior, the following method could be used:

In most automated manual transmissions, the accelerator pedal position, the engine speed and the speed of the incoming gearbox shaft are continuously sensed.

Should, the accelerator pedal position indicate that the clutch is a partly engaged clutch, and the engine speed differs from a speed of the incoming gearbox shaft, a tinier counting the time t is started. The scheme in FIG. 1 starts in step 1. If "Yes" in step 2 said timer is started in step 3. The timer could count the time t from clutch slipping initiation, and could be reset in case the clutch position would become fully disengaged (corresponds to a more released accelerator pedal) or if the speed of the incoming gearbox shaft would exceed a predetermined percentage of the engine speed (corresponds to a more depressed accelerator pedal). In an alternative not shown embodiment of the invention the timer could be started some short time after the clutch slipping has started.

Further the controller is programmed to measure the vehicle travel distance s by measuring, for example, the speed of the input shaft as an integral over time, starting in step 3, i.e. in the shown embodiment at the same time as the timer starts. In this way an absolute travelling distance of the vehicle is measured. This means that if, for example, the vehicle is standing in an uphill and the driver depresses the accelerator pedal to a degree so that the torque transmitted to the driving wheels would be enough to hold the vehicle ("hanging" on the clutch) and that the driver additionally varies his/hers depression of the accelerator pedal over time t around this accelerator pedal position so that the vehicle would typically rock back and forth. For such situation, a minimum absolute travelling distance si during a first predetermined time (see step 4) interval t1 could be set, for example 2 meters during 8 seconds. If the vehicle does not travel longer than said minimum absolute travelling distance si (see step 5) during said predetermined first time interval t1, the controller could be programmed to initiate a first warning measure (see step 6), in order to alert the driver of excessive clutch slip. The scheme ends in step 7.

In a further not shown embodiment of the method according to the invention the controller is programmed to initiate a measure of the vehicle speed when an excessive clutch slip condition as above has been established. The vehicle speed measuring is initiated instead of directly initiating said first warning measure (see step 6 in FIG. 1). The controller is then further programmed to initiate said first warning only if;
the vehicle has traveled less than said predetermined travelling distance during said predetermined first time interval, and
said measured vehicle speed is below a predetermined vehicle speed value.

In this way a warning to the driver is only initiated if the driver seems to continue with the clutch slip.

In a further not shown embodiment of the method according to the invention the controller is programmed to initiate a measure of a vehicle speed increase when an excessive clutch slip condition as above has been established. The vehicle speed increase measuring is initiated instead of directly initiating said first warning measure. The controller is then further programmed to initiate said first warning only if;
the vehicle has traveled less than said predetermined distance during said predetermined first time interval, and
said measured vehicle speed increase is below a predetermined vehicle speed increase value. In this way a warning to the driver is only initiated if the driver seems to continue with the clutch slip.

In a further not shown embodiment of the method according to the invention the controller is programmed to combine the vehicle speed measuring and the vehicle speed increase measuring. The controller is then programmed to initiate said first warning only if the vehicle has traveled less than said predetermined distance during said predetermined first time interval, and said measured vehicle speed is below a predetermined vehicle speed value, and said measured vehicle speed increase is below a predetermined vehicle speed increase value.

The above mentioned first warning measure could constitute one or several of the following measures:
a lighting of a light in a driver compartment of the vehicle,
a sounding of a beeper in a driver compartment of the vehicle,
automatically fully engage the clutch,
automatically fully disengage the clutch. Preferably the clutch could be engaged or disengaged slowly, so the driver has plenty of time to react and hit the brakes.

Said first time interval can be 4 to 10 seconds long. In a preferred embodiment said first time interval can be 6 to 8 seconds.

The method could be adjusted to detect various types of erratic behavior, e.g. by adjusting the predetermined percentage of the engine speed the incoming gearbox shaft should have in order to reset the timer. If this percentage is set to a low value, e.g. 5 percent of the engine speed, the method will be able to detect erratic behavior close to standstill, i.e. "hanging" on the gas in an uphill slope, such as explained earlier. If the percentage is set to a high value, e.g. 100 percent (indicating co-rotating engine and incoming gearbox shaft), the method could also be used to detect bad, i.e. slow, vehicle take-offs.

In another preferred embodiment of the invention there could also be a predetermined second time interval starting when the first time interval has ended. After said second time interval has passed the controller could be programmed to initiate a second warning measure, such as a forced engagement or disengagement of the clutch (if such a measure has not already been taken with the first warning measure). Of course also here the clutch could be engaged or disengaged slowly, so the driver has plenty of time to react and hit the brakes. This would communicate a second warning of excessive clutch slip to the driver. Said forced engagement of the clutch can be controlled via a preprogrammed ramp, which ramp decides the speed of engagement for a certain torque demand input through the accelerator pedal. It could happen that the driver performs a "pumping"-action with the accelerator pedal during the clutch slip/engagement procedure, that is, alternately pressing the accelerator pedal to the floor and/or letting the accelerator pedal up. Said "pumping"-action could be performed after said first warning (here first warning being audible and/or visual), "With such "pumping"-action during forced engagement (as mentioned above) it could be possible to continue erratic driver behaviour, since the timer counting (for the second time interval) could be reset and start all over again every time the driver lets up the accelerator pedal, or the opposite, presses the accelerator pedal to the floor."

In order to avoid this, said ramp for controlling the clutch could be changed every time the timer counting is reset. Preferably the ramp is changed to a steeper, i.e. more aggressive engagement compared to the previous used ramp. There could be several different ramps stored in the controller. One first ramp could be the one used the first time, thus having a relatively slow speed of engagement for a certain torque demand input through the accelerator pedal. A second ramp could have, for example, a 2.5 times more aggressive, i.e. faster engagement for the same torque demand compared to the first ramp. A third ramp could have an even further 2.5 times (or other figure) more aggressive engagement compared to the second ramp. This embodiment would after a few "pumping"-actions force the driver either to stop the vehicle with the service brake, which means that the clutch would be disengaged, or force the driver to drive away, which means that the clutch would be fully engaged. This embodiment with different ramps could also be used in connection with a first warning measure, where said first warning measure is a clutch engagement.

If the timer would reach the end of said first time interval t1, then a warning indicating a bad driver behavior could be initiated. The first time interval enables the controller to take a first measure, e.g. warn the driver that his behavior is erratic, if the first predetermined time interval has ended, and a second measure, e.g. a clutch disengagement or engagement, if the driver makes no correction of his erratic behavior, i.e. applies more or less accelerator pedal pressure, after having received the first warning of erratic behavior.

Regarding the warnings sent to the driver, a suitable first warning could be to light a warning light or sound a beeper, i.e. to produce a sound signal, in the vehicle cabin. Of course, it might be efficient to combine the light signal and the sound signal such that the driver becomes aware of his erratic behavior.

Should the driver disregard the first warning signal, i.e. neither release nor push the accelerator pedal, the controller may send a second warning to the driver. The second warning may e.g. be a slow clutch engagement or disengagement; should the clutch be engaged, the vehicle would start accelerating, and tests have shown that drivers in such cases will release the accelerator pedal and hit the vehicle brakes. Most drivers will find such a clutch engagement very inconvenient; hence, the erratic behavior will cease rapidly. If the second warning is clutch disengagement, the driver will lose drive wheel torque, which, if the vehicle is in an upward slope, will make the vehicle travel backwards and the engine to increase its speed. A natural driver behavior is to release the accelerator pedal and hit the brakes in such a situation; hence, excessive clutch wear could be avoided, and the driver learns to avoid such erratic behavior.

In a preferred embodiment said second time interval can be 2 to 10 seconds long.

As has been thoroughly explained, the invention solves the problem with erratic driver behavior regarding clutch wear in a very efficient way. There are however many variants and modifications possible within the scope of the invention, such as it is defined in the appended claims. One such modification could be use the method only when the gear shift lever is in the position "drive", i.e. forward driving position; during backwards maneuvers, it might be necessary for the driver to allow for some clutch slip in order to achieve a safe, smooth backing maneuver.

Figure 2:
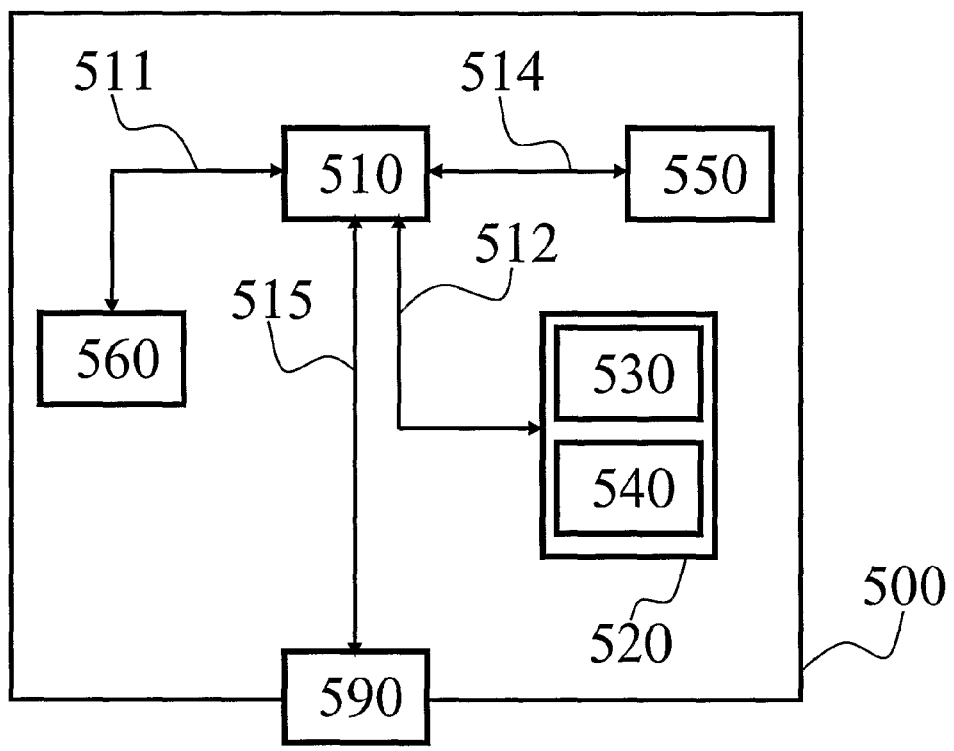

FIG. 2 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a controller, such as the above mentioned controller. The data-processing unit 510 can comprise, for example, a microcomputer.

The memory 520 also has a second memory part 540, in which a program for warning the driver of excessive clutch slip according to the invention is stored. In an alternative embodiment, the program for warning the driver of excessive clutch slip is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for protecting a clutch of a vehicle from excessive clutch slip, the vehicle being provided with an engine, drive wheels and an automated manual transmission for transmitting drive power from the engine to the drive wheels, the automated manual transmission comprising the clutch, a gearbox and a controller for controlling clutch engagement in response to sensed engine speed, input shaft speed of the gearbox and drive power demand from a vehicle driver, wherein the controller executes the steps of:
   a. sensing a power demand from the driver which results in a clutch control where the clutch is partly engaged and clutch slip occurs,
   b. measuring travelling distance(s) of the vehicle during a predetermined first time interval,
   c. initiating a first warning measure, in order to alert the driver of excessive clutch slip, if the vehicle has traveled less than a predetermined distance (si) during the predetermined first time interval.

2. The method of claim 1, comprising the further step of: starting the first time interval with the start of the clutch slip.

3. The method of claim 1, comprising the further step of: starting the first time interval a predetermined short time after the start of the clutch slip.

4. The method of claim 1, comprising the further step of:
   d. initiating a measuring of vehicle speed,
   e. initiating the first warning only if; the vehicle has traveled less than the predetermined travelling distance during the predetermined first time interval, and the measured vehicle speed is below a predetermined vehicle speed value.

5. The method of claim 1, comprising the further step of:
   d. initiating a measuring of vehicle speed increase,
   e. initiating the first warning only if; the vehicle has traveled less than the predetermined travelling distance during the predetermined first time interval, and the measured vehicle speed increase is below a predetermined vehicle speed increase value.

6. The method of claim 1, comprising the further step of:
   d. initiating a measuring of vehicle speed,
   e. initiating a measuring of vehicle speed increase,
   f. initiating the first warning only if; the vehicle has traveled less than the predetermined travelling distance during the predetermined first time interval, and the measured vehicle speed is below a predetermined vehicle speed value, and the measured vehicle speed increase is below a predetermined vehicle speed increase value.

7. The method of claim 1, comprising the further step of:

the controller initiating a second warning measure, in order to further alert the driver of excessive clutch slip, when a second time interval has passed, the second time interval starting when the first time interval has ended.

8. The method of claim 1, the first warning measure comprising a lighting of a light and/or a sounding of a beeper in a driver compartment of the vehicle.

9. The method of claim 7, the second warning measure comprising a full engagement or disengagement of the clutch.

10. The method of any preceding claim, wherein the first time interval is 4 to 10 seconds long.

11. The method of claim 7, wherein the second time interval is 2 to 10 seconds long.

12. The method of claim 1, wherein the method only is used if a gearshift lever of the vehicle is put in a position ordering a forward drive.

13. A computer program comprising a program code for executing the method as claimed in claim 1, when the computer program is executed on a computer.

14. A computer program product comprising a program code, stored on a computer-readable medium, for executing the method as claimed in claim 1, when the computer program is executed on the computer.

15. A computer program product directly loadable into an internal memory in a computer, which computer program product comprises a computer program for executing the method as claimed in claim 1, when the computer program on the computer program product is executed on the computer.

* * * * *